United States Patent

Koemm et al.

Patent Number: 4,540,765
Date of Patent: Sep. 10, 1985

[54] POLYURETHANES CONTAINING PERFLUOROALKYL GROUPS AND A PROCESS FOR THEIR PRODUCTION

[75] Inventors: Ulrich Koemm, Cologne; Klaus Geisler, Bonn, both of Fed. Rep. of Germany

[73] Assignee: Bayer Aktiengesellschaft, Leverkusen, Fed. Rep. of Germany

[21] Appl. No.: 612,095

[22] Filed: May 18, 1984

[30] Foreign Application Priority Data

May 27, 1983 [DE] Fed. Rep. of Germany ....... 3319368

[51] Int. Cl.³ .............................................. C08G 18/38
[52] U.S. Cl. ...................................... 528/45; 427/176; 427/389.9
[58] Field of Search ................ 528/45; 427/389.9, 176

[56] References Cited

U.S. PATENT DOCUMENTS 3,759,874 9/1973 Gresham ............................... 528/45

Primary Examiner—Maurice J. Welsh
Attorney, Agent, or Firm—Sprung, Horn, Kramer & Woods

[57] ABSTRACT

To render surfaces, such as of textile fabrics and fibers, repellent to oil and/or water, they are treated with novel polyurethanes containing perfluoroalkyl ligands and having as recurring structural units

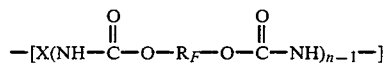

and/or -continued

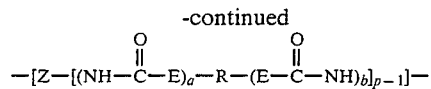

with chain ends of the formula $-YA_{m'}$ in which
- X, Y and Z each independently is the skeletal radical of an aliphatic or aromatic di- or polyisocyanate,
- $R_F$ is a difunctional radical containing at least one perfluoroalkyl ligand, the perfluoroalkyl chain comprising 3 to 30 carbon atoms and, in addition to fluorine atoms, containing at most one hydrogen or chlorine atom to two carbon atoms; and the perfluoroalkyl chain optionally being interrupted by oxygen,
- n is the number of isocyanate groups on the skeletal radical X and is an integer from 2 to 25,
- A is an isocyanate group protected by a blocking agent,
- m is the number of blocked isocyanate groups A on the skeletal radical Y and is an integer from 1 to 5,
- E is O, S or —NR'—,
- R' is H, alkyl or aryl,
- R is the radical of a compound containing at least two alcohol, amine and/or thiol groups,
- a and b are the number of —OH, —NR'H or —SH functions in the alcohols, amines or thiols R(EH)-$(a+b)$ used and each is an integer from 0 to 10, and
- p is the number of isocyanate groups on the skeletal radical Z and is an integer from 0 to 25.

Subsequent heating removes the end blocks and effects chemical fixation on the surface.

6 Claims, No Drawings

POLYURETHANES CONTAINING PERFLUOROALKYL GROUPS AND A PROCESS FOR THEIR PRODUCTION

This invention relates to new polyurethanes containing perfluoroalkyl ligands and the following recurring structural unit:

$$-[X(NH-C(O)-O-R_F-O-C(O)-NH)_{(n-1)}]$$

with chain ends corresponding to the following general formula:

$$-YA_m$$

The polyurethane chain may additionally contain units corresponding to the following general formula $$-\{-Z-[NH-C(O)-E)_a-R-(E-C(O)-NH-)_b-]_{(p-1)}\}-$$

In the above formulae:
X, Y and Z represent the skeletal radicals of aliphatic or aromatic di- and polyisocyanates;
$R_F$ represents a difunctional radical containing one or more perfluoroalkyl ligands, the perfluoroalkyl chain consisting of from 3 to 30 carbon atoms and, in addition to fluorine atoms, containing at most one hydrogen or chlorine atom to two carbon atoms; the skeletal chain may even be interrupted by oxygen atoms,
E represents the atoms O or S and also the molecular group —NR'— where R'=H, alkyl or aryl;
R represents a difunctional or polyfunctional radical derived from a di-(poly-) alcohol, amine or mercaptan or from a combination thereof;
a, b represent the number of —OH, —NR'H and —SH functions in the alcohols, amines or mercaptans $R-(EH)_{(a+b)}$ used, a and b independently of one another being integers from 0 to 10 and preferably from 0 to 3,
n, p represent the number of isocyanate ligands on the skeletal radicals X and Z, n and p independently of one another being integers from 2 to 25 and preferably from 2 to 5;
A represents isocyanate groups which have been blocked with suitable agents and which may be reactivated for chemical reaction by resplitting at elevated temperatures; blocking agents of the type in question are, for example, phenols, oximes and sulphite; and
m represents the number of blocked isocyanate groups A on the isocyanate radical Y with a value from 1 to 5.

The polyurethanes containing perfluoroalkyl ligands according to the invention preferably contain from 4 to 40% by weight of fluorine, preferably have average molecular weights of from 1000 to 20,000 and, at their chain ends, carry blocked isocyanate groups which enable the polyurethane to be applied to a substrate even from aqueous solution. After deblocking at elevated temperature, the polyurethane according to the invention is chemically fixed to the substrate by a reaction involving the free isocyanate groups. In this way, the resistance to oil and water of inorganic and organic objects may be permanently improved.

The present invention also relates to a process for producing the compounds according to the invention.

Urethanes containing perfluoroalkyl ligands and their use for hydrophobizing and oleophobizing solid surfaces are described in German Pat. Nos. 1,468,295 and 1,794,356, in French Pat. No. 1,316,488 and in U.S. Pat. Nos. 3,398,182; 3,484,281 and 3,896,251. The compounds claimed therein have a water- and oil-repelling effect. Through lack of adhesion to the substrate, the perfluoroalkyl ligands are not optimally oriented geometrically on the surface of the substrate. Aggravated by partially inadequate film-forming properties, uneconomically large quantities have to be used to obtain an effect. In addition, the known compounds are fixed to the substrates solely by adhesion so that the active substances may readily be removed by surfactant-containing water (detergents) or organic solvents (dry cleaning).

The polyurethanes containing perfluoroalkyl ligands according to the invention combine the possibility of chemically fixing the ends of the polyurethane chain to the substrate with excellent film-forming properties. This produces a very good, durable hydrophobizing and oleophobizing effect, even when the polyurethanes are used in reduced quantities (by virtue of the structure and chemical fixing of the compounds, the perfluoroalkyl ligands are optimally arranged geometrically). Chemical fixing is made possible by the specific incorporation at the chain ends of the polyurethane of blocked isocyanate groups which are unblocked at elevated temperatures and react on the substrate (thermal fixing).

Chemically fixed polyurethanes containing perfluoroalkyl ligands are not removed from the substrate by detachment processes, such as washing or dry cleaning; the impregnation is permanent. On the other hand, blocked isocyanates provide for application from aqueous suspensions. This enables the polymer containing perfluoroalkyl ligands to be applied together with other additives, such as flameproofing agents, oils, hand-improving agents and lubricants, antimicrobial agents or antistatic agents, in a single operation and is desirable in the interests both of ecology and of safety.

The process according to the invention for producing the above-described polyurethanes containing perfluoroalkyl ligands is characterized in that dialcohols containing perfluoroalkyl ligands and corresponding to the following general formula $$R_F-(OH)_2$$

in which $R_F$ is as defined above, optionally together with non-fluorinated di- or polyalcohols or amines or mercaptans corresponding to the following general formula $$R-[EH]_{(a+b)}$$

in which R, E and (a+b) are as defined above, in admixture or in blocks with one or more di- or polyisocyanates corresponding to the following general formulae $$X(NCO)_n; (Y(NCO)_{(m+1)}; Z(NCO)_p,$$

in which X, Y, Z, n, p and m are as defined above, are condensed in excess so that the polyurethane chains or networks formed carry at their ends free isocyanate groups which, finally, are blocked with a suitable protective group.

Known blocking agents for isocyanates are, for example, oximes, sulphites and phenols.

Condensation and blocking are best carried out in an aprotic polar solvent, such as for example acetone, MIBK, THF, DMF, acetic acid ester or N-methyl pyrrolidone. The urethane condensation step is preferably carried out at temperatures in the range of from 20° to 110° C. and the blocking step at temperatures in the range of from 10° to 60° C. The progress of the reaction may be followed analytically, more particularly by IR-spectroscopy. The reagents and solvents used must be free from water and it is advantageous to work in an inert gas atmosphere.

The polyurethanes containing perfluoroalkyl groups according to the invention may be applied to substrates from organic solvents, such as ketones, ethers, esters, alcohols or halogenated hydrocarbons, although they are preferably applied from aqueous dispersions for ecological and safety reasons.

Smooth, porous or fibrous surfaces may be finished with the polyurethanes containing perfluoroalkyl groups according to the invention. Examples of substrates such as these are paper, textile fabrics and fibers, glass, plastics, leather, wood or metal cloths.

In the treatment of objects, from 0.0001 to 1% by weight and preferably from 0.001 to 0.1% by weight of bound fluorine, based on the weight of the object, produces the required surface properties. Based on the surface area of the substrate, this corresponds to between about 0.01 and 100 mg of bound fluorine per square meter.

The $R_F$-units are preferably selected from mono- or difunctional N-sulphonyl or carbonyl perfluoroalkyl aminoalkanol derivatives and perfluorinated alcohols which contain at least one $CH_2$-group adjacent to the OH-group.

The following are examples of the dialcohols containing perfluoroalkyl ligands used in accordance with the invention (the perfluoroalkyl group is generally attached to the dialcohols in the form of a side chain):

| | |
|---|---|
| $C_4F_9SO_2N(C_2H_4OH)_2$ | A |
| $C_8F_{17}SO_2N(C_2H_4OH)_2$ | B |
| $C_8F_{17}SO_2N(CH_2-\underset{OH}{CH}-CH_3)_2$ | C |
| $C_8F_{17}SO_2N(CH_3)-CH_2-\underset{OH}{CH}-\underset{OH}{CH_2}$ | D |
| $C_8F_{17}SO_2N\underset{(C_2H_4O)_yH}{-(C_2H_4O)_xH}$   $x + y = 3-30$ | E |
| $C_4F_9-O-C_4F_8-SO_2N(C_2H_4OH)_2$ | F |
| $C_7F_{15}CON(C_2H_4OH)_2$ | G |
| $C_8F_{17}SO_2NH-\underset{O}{\overset{\|}{C}}-O-(CH_2)_2-C(C_2H_5)(C_2H_4OH)_2$ | H |
| $C_8F_{17}-CH_2-CH(CH_2OH)-CH_2-CHCl-CH_2OH$ | I |

The difunctional or polyfunctional reaction components containing reactive hydrogen and corresponding to the formula $R-(E)_{(a+b)}$, which may optionally be used in addition to the dialcohol-containing perfluoroalkyl groups, are selected from the group comprising di- or polyols, di- or polymercaptans and di- or polyamines. The following are examples of reaction components such as these:

| | |
|---|---|
| $HO-C_2H_4-OH$ | K |
| 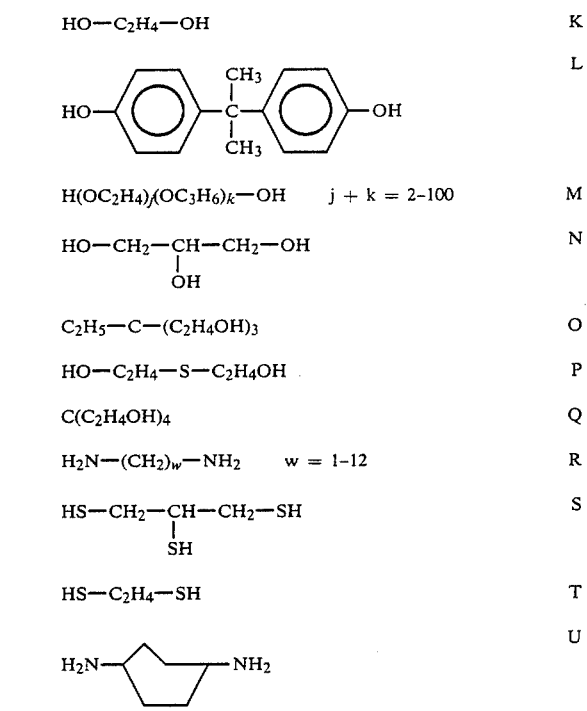 | L |
| $H(OC_2H_4)_j(OC_3H_6)_k-OH$   $j + k = 2-100$ | M |
| $HO-CH_2-\underset{OH}{CH}-CH_2-OH$ | N |
| $C_2H_5-C-(C_2H_4OH)_3$ | O |
| $HO-C_2H_4-S-C_2H_4OH$ | P |
| $C(C_2H_4OH)_4$ | Q |
| $H_2N-(CH_2)_w-NH_2$   $w = 1-12$ | R |
| $HS-CH_2-\underset{SH}{CH}-CH_2-SH$ | S |
| $HS-C_2H_4-SH$ | T |
| 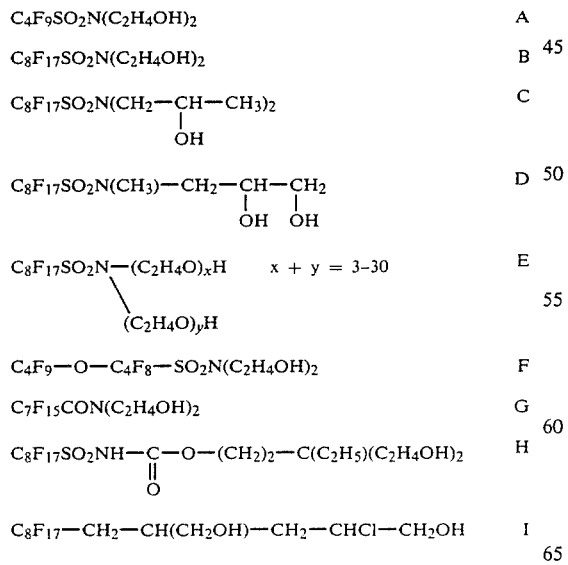 | U |

Examples of di- and polyisocyanates which may be used in the process according to the invention are listed below. The di- and polyisocyanates shown by way of example may also contain further perfluoroalkyl chains as ligands or bridges.

Di and polyisocyanates corresponding to the general formulae $X(NCO)_n$, $Y(NCO)_{(m+1)}$ and $Z(NCO)_p$:

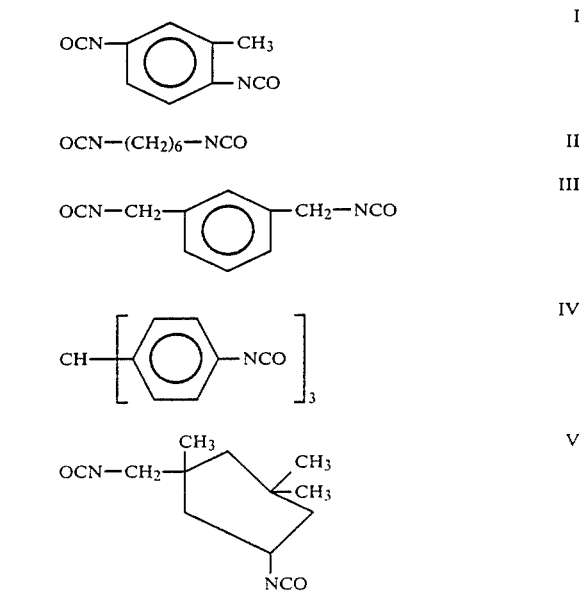

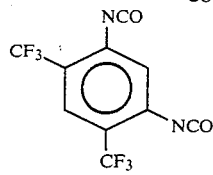

VI agents) are used in conjunction with the ratios in which the monomers are used. Thus, $(A)_2(I)_3(1)_2$ represents a perfluoroalkyl polyurethane according to the invention of 2 parts of the perfluorodiol A and 3 parts of the diisocyanate I, the remaining isocyanate groups having been blocked with 2 parts of 1:

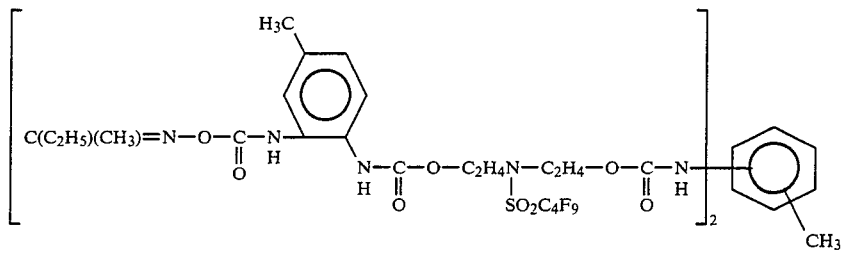

TABLE 1
Examples of compounds according to the invention $(A)_2(B)_2(II)_3(V)_2(\underline{1})_2$
$(A)_6(O)_1(III)_3(IV)_3(VI)_3(\underline{1})_6$
$(B)_3(I)_3(IV)_1(\underline{2})_3$
$(B)_2(II)_1(V)_2(\underline{1})_2$
$(B)_2(II)_1(V)_2(\underline{2})_2$
$(B)_2(M)_1(II)_2(V)_2(\underline{1})_2$
$(B)_3(N)_1(I)_3(IX)_3(\underline{1})_3$
$(B)_4(II)_3(V)_2(\underline{1})_2$
$(B)_4(V)_4(VII)_2(\underline{1})_4$
$(C)_3(II)_2(V)_2(\underline{3})_2$
$(D)_2(L)_2(II)_3(V)_2(\underline{1})_2$
$(E)_2(M)_1(V)_2(VII)_2(\underline{1})_2$
$(F)_2(T)_2(II)_3(V)_2(\underline{5})_2$
$(H)_3(R)_1(II)_2(IV)_2(\underline{1})_2$
$(J)_2(K)_1(III)_4(\underline{1})_2$ The following are examples of blocking agents which may be used in the process according to the invention:

$CH_3-C(C_2H_5)=N-OH$  1 benzenediol (OH, OH)  2 phenol (OH)  3

$NaHSO_3$  4

$\left(\bigcirc\right)_2 C=N-OH$  5

A number of compounds according to the invention produced by the described process are listed in Table 1. To characterize the polyaddition compounds, the symbols used in the foregoing for the monomers (Roman numerals for isocyanates, letters for polyols, polyamines or polymercaptans, underlined numbers for blocking The compounds according to the invention may be characterized by infra-red and nuclear resonance spectroscopy:

Commensurate with the units selected (isocyanate polyol etc.), the resonance images of the monomers are found in the $^1H$- and $^{19}F$-nuclear resonance spectra of the polymers in an intensity corresponding to the monomer ratios.

However, allowance has to be made for a high-field or low-field shift of molecular groups adjacent the polycondensation centers. Thus, for example the resonance frequency of the methyl group in butanone oxime shifts from 1.75 ppm in the free molecule to 1.89 ppm in the condensate (rel. i. TMS, solvent $DMSO-d_6$).

Where the nuclear resonance spectra show up the units used in the polymer, the linkage of the polymer may be examined by IR-spectroscopy. Thus, no more isocyanate vibrations for example are found in the polycondensate at 2200 to 2300 $cm^{-1}$; instead strong urethane-carbonyl vibration bands are found at approximately 1700 $cm^{-1}$ and the carbonyl vibration bands of the blocked isocyanates at approximately 1650 $cm^{-1}$. The C-F-vibration bands in the range of from 1100 to 1300 $cm^{-1}$ are also characteristic of all the compounds according to the invention.

The invention is further illustrated by the following examples in which the percentages quoted represent percentages by weight, unless otherwise indicated.

EXAMPLE 1

1175 g (2 moles) of compound B are dissolved in 3200 ml of acetone (anhydrous) and the resulting solution is heated to boiling temperature (56° C.). 168 g of isocyanate II (1 mole) are added dropwise over a period of 30 minutes. After 1 hour, 440 g (2 moles) of isocyanate V are added. After another 3 hours, the mixture is cooled and 192 g (2.2 moles) of butanone oxime are added. The progress of the reaction may be followed by IR-spectroscopy. After the excess isocyanate has been completely blocked, no further isocyanate vibration can be detected at 2300 cm$^{-1}$. The polyurethane according to the invention containing perfluoroalkyl groups may be isolated by distilling off the acetone and has been very successfully applied to various substrates. Melting point of the substance: 75° to 80° C.

EXAMPLE 2

The procedure is as in Example 1, except that the excess isocyanate is blocked with 242 g (2.2 moles) of resorcinol. The effect of the polyurethane is as good as in Example 1. Melting point: 115°-120° C.

EXAMPLE 3

38.7 g (0.1 mole) of compound A and 58.7 g (0.1 mole) of compound B are dissolved in 500 ml of acetone (anhydrous) and the resulting solution is heated to boiling temperature. 25.2 g (0.15 mole) of compound II and 22 g (0.1 mole) of compound V are added in the same way as in Example 1. A highly effective product melting at 80° to 90° C. is obtained after blocking with butanone oxime (96 g=0.11 mole).

EXAMPLE 4

68.4 g of compound L (0.2 mole) are dissolved in 1 liter of acetone and 33.6 g (0.3 mole) of compound II are added to the resulting solution, followed by stirring for 1 hour at 50° C. After the addition of 117.4 g (0.2 mole) of compound B and a reaction time of 3 hours, 44.4 g (0.2 mole) of isocyanate V are added. After another 3 hours, the excess isocyanate is blocked as in Example 1 with 19.2 g (0.22 mole) of butanone oxime. The product of this Example also shows very favorable properties. M.p.: 95°-100° C.

EXAMPLE 5

0.01 mole of a difunctional polyether having a molecular weight of 3822 (65% of ethylene oxide, 35% of propylene oxide) are dissolved in 100 ml of dioxane (anhydrous) and the resulting solution is reacted for 30 minutes at 50° C. with 6.7 g (0.02 mole) of isocyanate VII. The further reaction is carried out with 14.4 g (0.02 mole) of compound E (x+y=5), 4.5 g (0.02 mole) of isocyanate V and 2 g (0.02 mole) of butanone oxime in the same way as in Example 4. Melting point: 90°-95° C.

EXAMPLE 6

92 g (1 mole) of compound N are added dropwise to a solution of 522 g of isocyanate IX in 4 liters of methyl isobutyl ketone. After the addition of 1.76 kg of compound B, the mixture is heated for 3 hours to 80° C. After cooling to 50° C., 480 g (3 moles) of isocyanate I are added, followed after another 3 hours by the addition of 287 g (3.3 moles) of butanone oxime. This compound also has excellent oil- and water-repellent properties on various substrates. Melting point: >200° C. (decomposition).

EXAMPLE 7

6 g (0.1 mole) of compound R (W=2) are dissolved in 500 ml of acetone, followed by the addition of 33.6 g (0.2 mole) of compound II. After 30 minutes, 137 g (0.3 mole) of compound H are added, followed by stirring for 3 hours at 50° C. After reaction with 74.6 g (0.2 mole) of compound IV and blocking with 35 g (0.4 mole) of butanone oxime in the same way as in Example 1, a polyurethane containing perfluoroalkyl ligands according to the invention is again obtained.

EXAMPLE 8

To illustrate the favourable properties of the compounds according to the invention, a 0.2% solution of the product of Example 1 in acetone is prepared and a piece of polyamide fabric is impregnated therewith. The solvent is evaporated off and the active substance is fixed for 3 minutes at 150° C. 0.1 mg of bound flourine per gram (sample A) adhere to the fabric. 0.2% and 1% solutions of a commercially available perfluoroalkyl urethane compound in acetone were prepared and a piece of polyamide fabric was impregnated with each solution. The two comparison samples were dried and fixed in the same way as Sample A. Approximately 0.1 mg (comparison sample B) and 0.5 mg (comparison sample C) of bound fluorine per gram of fabric are applied.

Sample A impregnated with the polyurethane according to the invention shows very good oil- and water-repelling properties, as does comparison sample C, although it is finished with 5 times the quantity of bound fluorine. Comparison sample B is soon wetted by droplets of oil and water.

In order further to demonstrate the advantages afforded by the chemical fixing of the polyurethanes containing perfluoroalkyl chains according to the invention, sample A and comparison sample C were treated for 60 minutes with hot detergent solution and then washed for 30 minutes in running warm water. After drying, sample A still shows very good oil- and water-repelling properties whereas those of comparison sample C have largely disappeared.

EXAMPLE 9

This example demonstrates the favorable properties of the compounds according to the invention for the soil-repellent finishing of polyamide carpet yarn.

An aqueous emulsion A containing 21% by weight of a compound of Example 1 (corresponding to 7% by weight of flourine) is prepared.

Another aqueous emulsion B is prepared which contains 12% by weight of a finishing oil consisting of 40% by weight of an aliphatic ester, 20% by weight of ethoxylated castor oil and 40% by weight of a fatty alcohol phosphoric acid ester.

1 part of emulsion A is mixed with 7 parts of emulsion B to form an emulsion C.

Two polyamide carpet yarns are then produced, the only difference between them being that emulsion C is applied to one yarn ("test yarn") and emulsion B to the other yarn ("standard yarn"). Both emulsion B and emulsion C are applied by means of a perparation godet during spinning of the yarns. In the case of the test yarn, emulsion C is applied in a quantity such that the fluorine content of this yarn amounts to approximately 500 parts per million.

The standard yarn and the test yarn are both drawn and textured in the usual way. The perfluoroalkyl compound adhering to the test yarn is chemically fixed by the heating at 150°-175° C. normally applied during this stretch-texturing treatment.

The two yarns (test yarn and standard yarn) are each made up into a tufted carpet ("test carpet" and "standard carpet"). The carpets obtained are subsequently dyed in a winch vat and then latexed. The test carpet and standard carpet are tested for their soil-repelling effect, their water-repelling effect and their oil-repelling effect (see Table below).

| Property | Standard Carpet | Test Carpet |
|---|---|---|
| Soil-repelling effect (1) | 2 | 4 |
| Water-repelling effect (2) | none | good |
| Oil-repelling effect (3) | 1 | 2-3 |

(1) The soil-repelling effect was determined after the test carpet and standard carpet had been walked on 10,000 times in a practical test. For comparison purposes, parts of the test carpet and standard carpet remained untrodden. Determination was carried out by measuring the difference in color between the trodden (10,000 times) and untrodden parts of the standard carpet and test carpet using AATCC test method 121-1970. Evaluation of the color difference is based on a scale of 1 to 5 in which 1 represents heavy soiling and 5 very slight-soiling.
(2) Visual examination: droplets of water were applied by pipette to the test carpet and standard carpet. The standard carpet was immediately wetted whereas, in the case of the test carpet, the water lay on the surface in the form of droplets.
(3) Measured by AATCC test No. 118-1975. The scale extends from 1 to 8, a higher value indicating a better oil-repelling effect.

These experiments show that, even after making up into a carpet and dyeing, the perfluoroalkyl compound applied provides the carpet with excellent soil-, water- and oil-repelling properties.

It will be appreciated that the instant specification and examples are set forth by way of illustration and not limitation, and that various modifications and changes may be made without departing from the spirit and scope of the present invention.

We claim:

1. A polyurethane containing perfluoroalkyl ligands and having as recurring structural units $$-[X(NH-\overset{O}{\underset{\|}{C}}-O-R_F-O-\overset{O}{\underset{\|}{C}}-NH)_{n-1}]-,$$

and optionally, $$-[Z-[(NH-\overset{O}{\underset{\|}{C}}-E)_a-R-(E-\overset{O}{\underset{\|}{C}}-NH)_b]_{p-1}]-$$

with chain ends of the formula $$-YA_{m'}$$

in which

X, Y and Z each independently is the skeletal radical of an aliphatic or aromatic di- or polyisocyanate, $R_F$ is a member selected from the group consisting of $$C_4F_9SO_2N(C_2H_4-)_2$$

$$C_8F_{17}SO_2N(C_2H_4-)_2$$

$$C_8F_{17}SO_2N(CH_2-\overset{|}{C}H-CH_3)_2$$

-continued $$C_8F_{17}SO_2N(CH_3)-CH_2-\overset{|}{C}HCH_2$$

$$C_8F_{17}SO_2N\overset{\diagdown}{\underset{(C_2H_4O)_yC_2H_4-}{-(C_2H_4O)_xC_2H_4-}} \quad x+y=28$$

$$C_4F_9-O-C_4F_3-SO_2N(C_2H_4-)_2$$

and $$C_8F_{17}SO_2NH-\overset{O}{\underset{\|}{C}}-O-(CH_2)_2-C(C_2H_5)(C_2H_4-)_2$$

n is the number of isocyanate groups on the skeletal radical X and is an integer from 2 to 25,
A is an isocyanate group protected by a blocking agent,
m is the number of blocked isocyanate groups A on the skeletal radical Y and is an integer from 1 to 5,
E is O, S or —NR'—,
R' is H, alkyl or aryl,
R is the radical of a compound containing at least two alcohol, amine and/or thiol groups,
a and b are the number of —OH, —NR'H or —SH functions in the alcohols, amines or thiols R(EH)$_{(a+b)}$ used and each is an integer from 0 to 10, and
p is the number of isocyanate groups on the skeletal radical Z and is an integer from 0 to 25.

2. A polyurethane containing perfluoroalkyl ligands according to claim 1, wherein the blocking agent of A is the radical of an oxime.

3. A process for producing a polyurethane containing perfluoroalkyl ligands according to claim 1, comprising condensing an excess of a dialcohol containing perfluoroalkyl ligands and of the following formula $$R_F-(OH)_2$$

optionally together with non-fluorinated di- or polyalcohols, amines or mercaptans of the formula $$R-(EH)_{(a+b)}$$

in admixture or in blocks with at least one polyisocyanate of the formula $$X(NCO)_{n'} \; Y(NCO)_{(m+1)} \text{ and } Z(NCO)_{p'}$$

so that the polyurethane chains or networks formed at their ends carry free isocyanate groups, and blocking the free isocyanate end groups with a protective group, $R_F$, R, E, a, b, X, n, Y, m, Z and p having the definitions set forth in claim 1.

4. In the treatment of a surface with a perfluoralkyl-containing polyurethane to render it oil- and/or water-repellent, the improvement which comprises employing as the perfluoroalkyl-containing polyurethane a material according to claim 1 and thereafter heating to effect chemical fixation with the surface.

5. The process according to claim 4, wherein the surface is a textile fiber or fabric.

6. The process according to claim 4, wherein the surface is that of a synthetic fiber as spun, the fiber thereafter being drawn and heated to effect the chemical fixation.

* * * * *

UNITED STATES PATENT AND TRADEMARK OFFICE
CERTIFICATE OF CORRECTION

PATENT NO. : 4,540,765                      Page 1 of 2
DATED      : September 10, 1985
INVENTOR(S): Ulrich Koemm, et al.

It is certified that error appears in the above-identified patent and that said Letters Patent is hereby corrected as shown below:

| | |
|---|---|
| Abstract, line 32 | "used...and" need not be italicized. |
| Col. 2, line 64 | Before "Y" delete "(" |
| Col. 5, lines 45, 46, 51, 56, 57 | Underline "$\underline{1}$", "$\underline{2}$", "$\underline{3}$", "$\underline{4}$", and "$\underline{5}$" respectively |
| Col. 5, line 60 | Delete structure and substitute: |

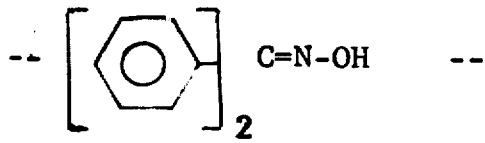

| | |
|---|---|
| Col. 6, lines 3, 7 | Delete "1" and substitute --$\underline{1}$-- |
| Col. 6, Table 1, lines 22, 23, 25, 27, 28, 29, 30, 32, 33, 35 and 36 | Delete "(1)" and substitute --($\underline{1}$)-- |
| Col. 6, lines 24, 26 | Delete "(2)" and substitute --($\underline{2}$)-- |
| Col. 6, line 31 | Delete "(3)" and substitute --($\underline{3}$)-- |
| Col. 6, line 34 | Delete "(5)" and substitute --($\underline{5}$)-- |
| Col. 8, line 59 | Correct spelling of "preparation" |

UNITED STATES PATENT AND TRADEMARK OFFICE
CERTIFICATE OF CORRECTION

PATENT NO. : 4,540,765
DATED : September 10, 1985
INVENTOR(S) : Ulrich Koemm, et al.

It is certified that error appears in the above-identified patent and that said Letters Patent is hereby corrected as shown below:

Col. 9, line 45  Before "optionally" insert --,--

Col. 10, line 1  End of line delete "$-\underset{|}{C}H\underset{|}{C}H_2$"

and substitute:

$$-- \quad -\underset{|}{C}H-\underset{|}{C}H_2 \quad --$$

Signed and Sealed this

Eighteenth Day of February 1986

[SEAL]

Attest:

DONALD J. QUIGG

Attesting Officer

Commissioner of Patents and Trademarks